(12) United States Patent
Daoud

(10) Patent No.: US 6,294,734 B1
(45) Date of Patent: Sep. 25, 2001

(54) CABLE SEALING DEVICE FOR CONSECUTIVE CABLE PORTS

(75) Inventor: Bassel Hage Daoud, Parsippany, NJ (US)

(73) Assignee: Avaya Technology Corp., Basking Ridge, NJ (US)

(*) Notice: Subject to any disclaimer, the term of this patent is extended or adjusted under 35 U.S.C. 154(b) by 0 days.

(21) Appl. No.: 09/515,652

(22) Filed: Feb. 29, 2000

(51) Int. Cl.$^7$ ........................................... H02G 3/18
(52) U.S. Cl. ................... 174/65 R; 174/152 G; 248/56; 16/2.2
(58) Field of Search ................. 174/65 R, 65 G, 174/655, 135, 152 G, 153 G, 64, 151; 248/56; 16/2.1, 2.2

(56) References Cited

U.S. PATENT DOCUMENTS

| | | | |
|---|---|---|---|
| 3,363,216 | * 1/1968 | Benedetto | 439/147 |
| 3,779,585 | * 12/1973 | Handzlik | 285/136.1 |
| 5,567,174 | * 10/1996 | Ericson, Jr. et al. | 439/462 |
| 5,648,639 | * 7/1997 | Hand | 174/51 |

* cited by examiner

Primary Examiner—Dean A. Reichard
Assistant Examiner—Dhiru R. Patel

(57) ABSTRACT

A sealing device includes a base with a first end and a second open end. A cylindrical inner wall is formed inside the base and communicates the first end to the second open end. First threads are formed on the cylindrical inner wall, and a first through hole is formed in the first end. A cap includes a top, an open bottom, and a cylindrical outer wall. Second threads are formed on the cylindrical outer wall for mating engagement with the first threads. A second through hole is formed in the top. A tapering inner wall is formed inside the cap and communicates the second through hole to the open bottom. A gasket resides adjacent to the first end of the base and within the tapering inner wall of the cap. A third through hole is formed in the gasket and the first, second, and third through holes are aligned to receive a cable, wire or similar cylindrical object. Tightening of the cap into the base results in compression of the gasket, constriction of the third through hole, and thereby sealing of the cable.

17 Claims, 6 Drawing Sheets

CABLE SEALING DEVICE FOR CONSECUTIVE CABLE PORTS

BACKGROUND OF THE INVENTION

1. Field of the Invention

The present invention relates to a sealing device.

2. Description of the Relevant Art

Computers or electrical devices are sometimes deployed in surroundings exposed to environmental elements. For example, telephone interface devices may be located on telephone poles, in boxes at a roadside, or under a body of water. Such devices are housed inside sealed enclosures to protect sensitive electrical equipment from exposure to contaminants, such as water, insects and dust.

Often many incoming and outgoing cables, such as electrical cables and fiber optic cables, are connected to the sensitive electrical equipment and communicate to the world outside the enclosure. Therefore, some arrangement must be provided around the cables to allow the incoming and outgoing cables to enter and exit the enclosure, without violating the sealed integrity of the enclosure.

FIGS. 1–4 illustrate a cable sealing arrangement in accordance with the background art. FIG. 1 is a view of an upper surface 3 of an enclosure 1 having a plurality of cable sealing devices 2. FIG. 2 is a close-up perspective view of one of the cable sealing devices 2 of FIG. 1. FIG. 3 illustrates a disassembled cable-sealing device 2. FIG. 4 illustrates an assembled cable-sealing device 2, sealing a cable 4.

Each cable-sealing device 2 includes a base 5. The base 5 is attached to, and protrudes upward from, the upper surface 3 of the enclosure 1. The base 5 has first threads 6 formed around an outer periphery thereof An inside of the base 5 includes a first through hole 7, which communicates an interior of the enclosure 1 with the environment surrounding the enclosure 1. A periphery of the first through hole 7 is formed by a continuous tapered inner wall 8, which tapers in a direction opening away from the enclosure 1.

Each cable-sealing device 2 further includes a gasket 9, such as a grommet. An outer profile of the gasket 9 resembles a cork. A continuous tapered outer wall 11 of the gasket 9 is tapered in a direction opening away from the enclosure 1. A second through hole 10 is formed in a center of the gasket 9. A periphery of the second through hole 10 is formed by a continuous straight inner wall 12. The gasket 9 is made of a compressible and resilient material, such as rubber.

Finally, each cable-sealing device 2 includes a cap 13. Outer walls 14 of the cap 13 form a hexagon, like a bolt or nut. An inside of the cap 13 is hollow and provided with second threads 16 around an inner periphery wall. A third through hole 15 is formed in a center of an upper surface of the cap 13 and passes through to an undersurface 18 of the cap 13. The undersurface 18 of the cap 13 forms a boundary wall of the hollow inside of the cap 13.

As illustrated in FIG. 4, the gasket 9 is interposed between the base 5 and the cap 13. The second threads 16 of the cap 13 are engaged to the first threads 6 of the base 5. Clockwise rotation of the cap 14 causes the undersurface 18 of the cap 13 to contact the gasket 9 and forces the gasket 9 further into the first through hole 7 in the base 5.

As the gasket 9 is pushed into the first through hole 7, the tapered outer wall 11 of the gasket 9 contacts with the tapered inner wall 8 of the base 5. The contact causes radial forces tending to close the second through hole 12 in the gasket 9. Therefore, tightening of the cap 13 results in a seal being formed around the cable 4, as well as, a seal being formed between the outer walls 11 of the gasket 9 and the inner walls 8 of the base 5.

The cable sealing device 2 according to the background art performs adequately in sealing a cable port in the enclosure 1. However, other drawbacks exist in the system of the background art. As illustrated in FIG. 1, in order to tighten or loosen the caps 13, a service technician applies a hand wrench 17. The hand wrench 17 engages the outer walls 14 of the cap 13. Therefore, a space must exist between adjacent cable sealing devices 2 to accommodate the hand wrench 17. Accordingly, an area of the upper surface 3 of the enclosure 1 must be made relative large in order to accommodate a desired number of cables 4. Conversely, the number of cables 4 must be limited in order to fit into a desired area for the upper surface 3 of the enclosure 1.

SUMMARY OF THE INVENTION

Accordingly, it is an object of the invention to provide a system for sealing cables, which overcomes one or more of the drawbacks associated with the background art.

It is a further object of the invention to provide a cable sealing arrangement, which allows a greater number of cables to be passed through a given surface area of an enclosure relative to the background art.

It is an even further object of the invention to provide a cable sealing arrangement, which allows a surface area of an enclosure to be made smaller, relative to the background art, while still accommodating a same number of cables.

These and other objects of the invention are accomplished by a sealing device including a base with a first end and a second open end. A cylindrical inner wall is formed inside the base and communicates the first end to the second open end. First threads are formed on the cylindrical inner wall, and a first through hole is formed in the first end. A cap includes a top, an open bottom, and a cylindrical outer wall. Second threads are formed on the cylindrical outer wall for mating engagement with the first threads. A second through hole is formed in the top. A tapering inner wall is formed inside the cap and communicates the second through hole to the open bottom. A gasket resides adjacent to the first end of the base and within the tapering inner wall of the cap. A third through hole is formed in the gasket and the first, second, and third through holes are aligned to receive a cable, wire or similar cylindrical object. Tightening of the cap into the base results in compression of the gasket, constriction of the third through hole, and thereby sealing of the cable.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
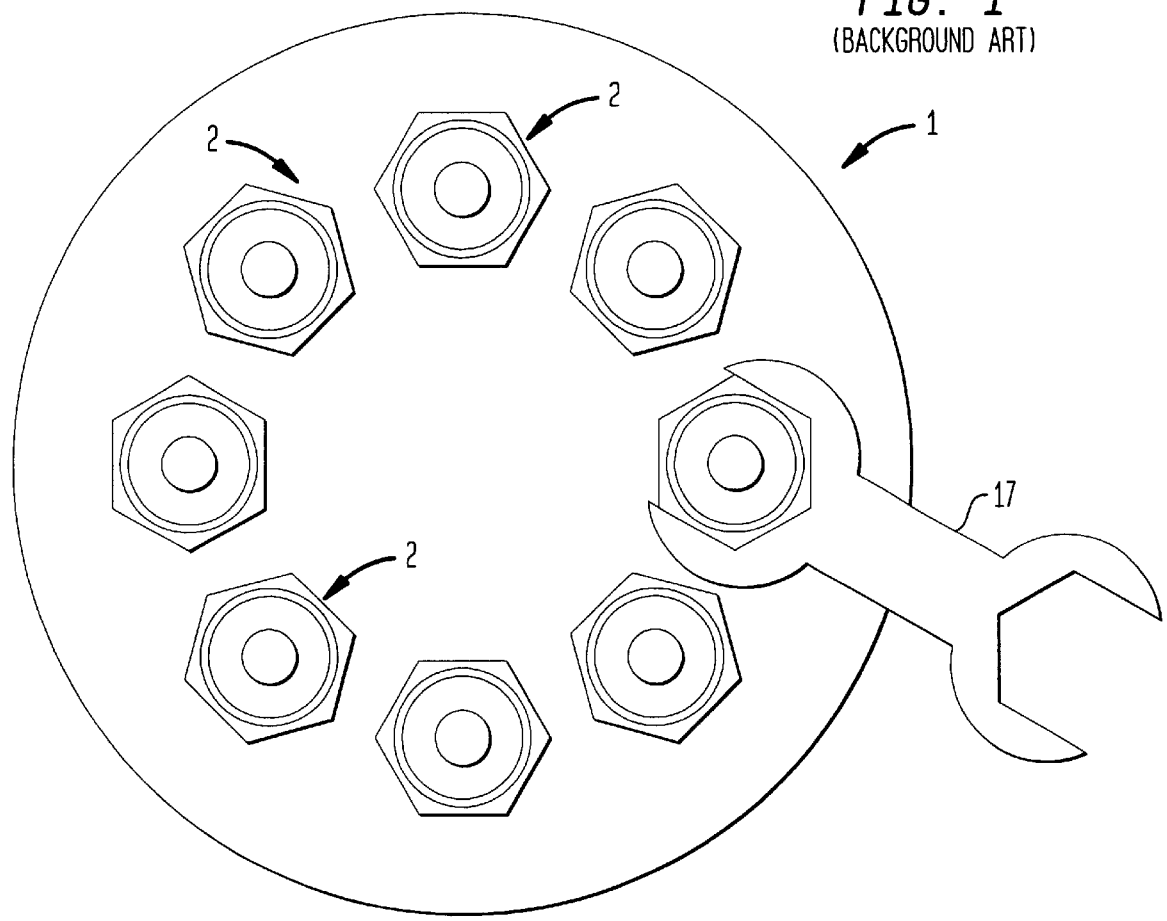
FIG. 1 is a top view of an enclosure having a plurality of cable sealing devices, in accordance with the background art.
Figure 2:
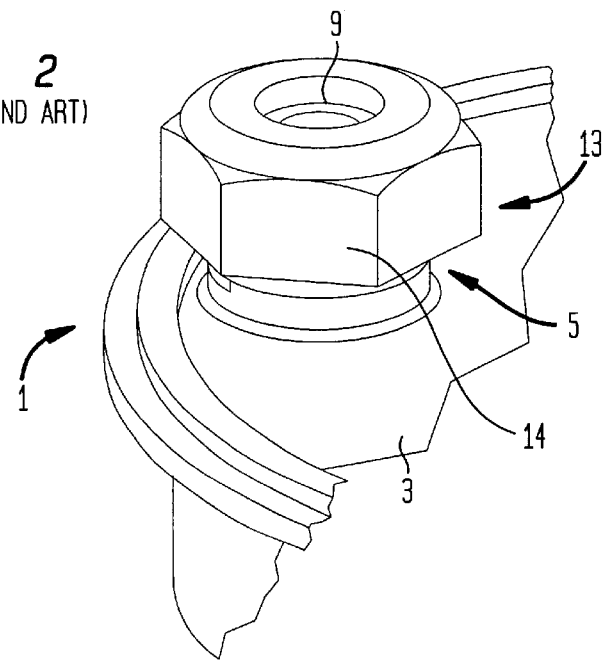
FIG. 2 is a perspective view of one of the cable sealing devices of FIG. 1.
Figure 3:
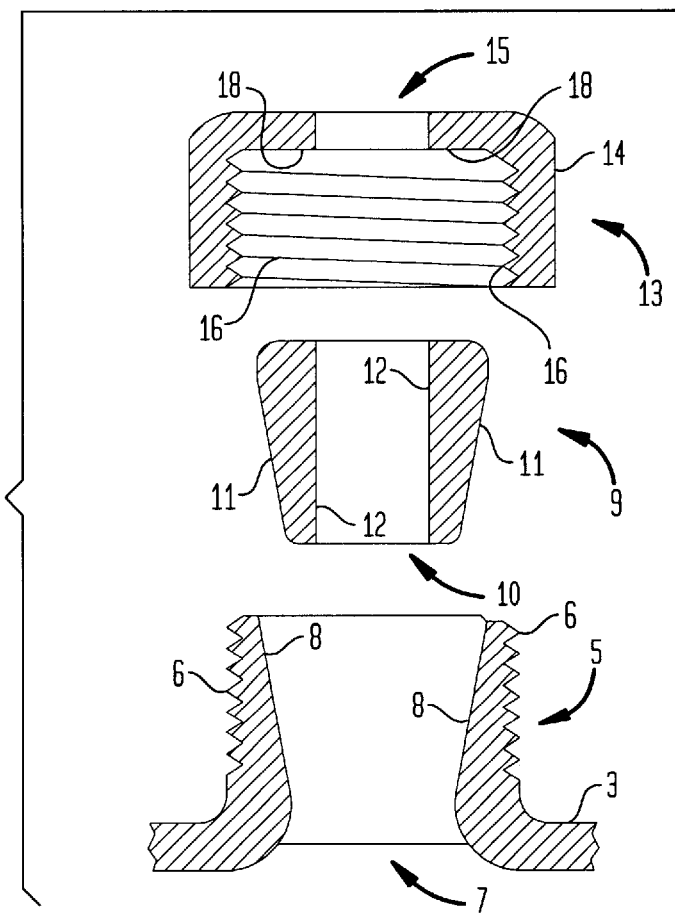
FIG. 3 is a front view, in cross section, of a disassembled cable sealing device, in accordance with the background art.
Figure 4:
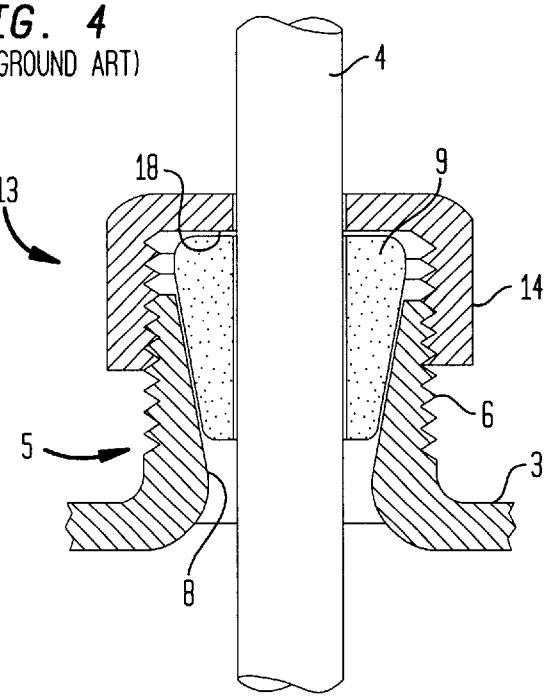
FIG. 4 is a front view, in cross section, of an assembled cable sealing device sealing a cable, in accordance with the background art.
Figure 5:
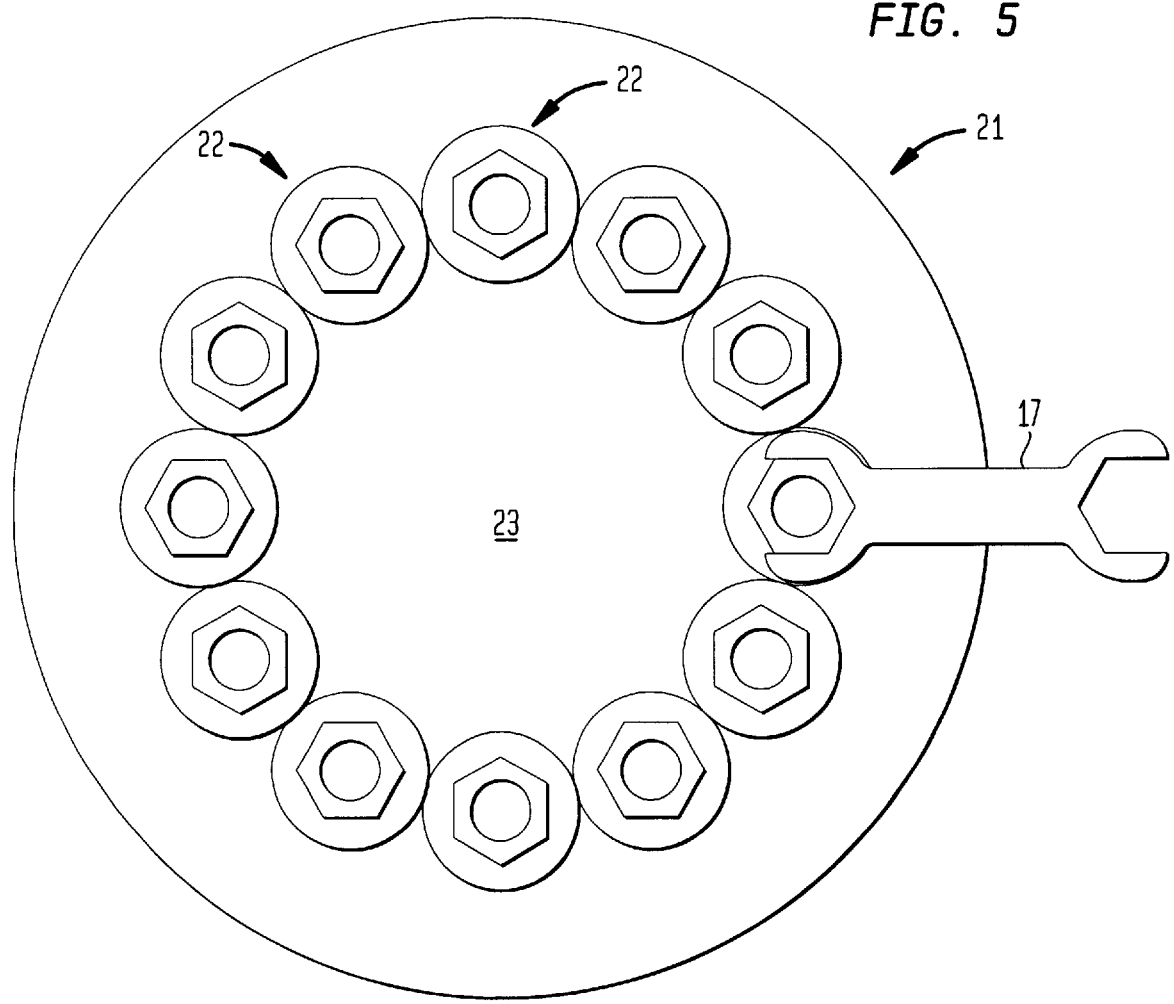
FIG. 5 is a top view of an enclosure having a plurality of cable sealing devices, in accordance with the present invention.

Now with particular reference to FIGS. 5–9, the structure and operation of a cable sealing device in accordance with the present invention will be disclosed. FIG. 5 is a view of an outer surface 23 of an enclosure 21 having a plurality of cable sealing devices 22, in accordance with the present invention.

Each cable sealing device 22 includes a base 25. The base 25 is attached to, and protrudes upward from, the outer surface 23 of the enclosure 21. An inside of the base 25 is hollow and a periphery of the hollow is formed by a continuous straight wall having first threads 26. The hollow is also defined by a ledge 40 at a first end and an second open end. The ledge 40 includes a first through hole 27, which communicates an interior of the enclosure 21 with the environment surrounding the enclosure 21. An outside of the base 25 is defined by a continuous smooth wall 28.

Each cable sealing device 22 further includes a cap 33. A cylindrical outer wall 34 of the cap 33 is formed by a continuous straight wall, matching or closely approximating the diameter of the continuous smooth wall 28 of the base 25. Second threads 36 are formed on lower portions of the cylindrical outer wall 34. An inside of the cap 33 is hollow and defined by a top, an open bottom, and a continuous tapering inner wall 38, which is tapered in a direction opening toward the enclosure 21. A second through hole 35 is formed in a center of the top of the cap 33 and passes through to the hollow interior defined by the continuous tapering inner wall 38. A projection 39 is attached to the top of the cap 33 and encircles the third through hole 35. The projection serves as a tool engaging surface. An outer profile of the projection 39 forms a hexagon, like a bolt or nut.

Finally, each cable sealing device 22 includes a gasket 29, such as a grommet. An outer profile of the gasket 29 resembles an inverted cork. A continuous tapering outer wall 31 of the gasket 29 is tapered in a direction opening toward the enclosure 21 A third through hole 30 is formed in a center of the gasket 29. A periphery of the third through hole 30 is formed by a continuous straight inner wall 32. The gasket 29 is made of a resilient, flexible, or compressible material, such as rubber.

Figure 9:
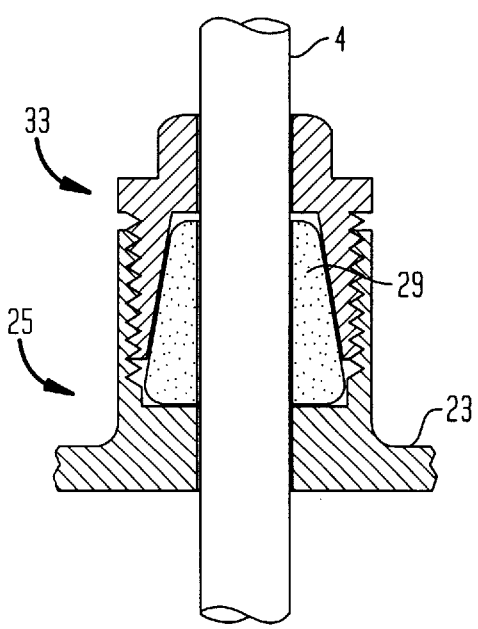
FIG. 9 is a front view, in cross section, of an assembled cable sealing device sealing a cable, in accordance with the present invention.

As illustrated in FIG. 9, the gasket 29 is interposed between the base 25 and the cap 33, and rests upon the ledge 40 formed around the first through hole 27. The second threads 36 of the cap 33 are engaged to the first threads 26 of the base 25. Clockwise rotation of the cap 33 causes the continuous tapering inner wall 38 of the cap 33 to contact the continuous tapering outer wall 31 of the gasket 29.

As the cap 33 is tightened further into the base 25, the contact between the continuous tapering inner wall 38 and the continuous tapering outer wall 31 causes radial forces tending to close the third through hole 32 in the gasket 29. Therefore, tightening of the cap 33 results in a seal being formed around the cable 4 passing through the third through hole 32, as well as, a seal being formed between the continuous tapering inner wall 38 and the continuous tapering outer wall 31.

As illustrated in FIG. 5, the structural arrangement of components in the present invention allows closer placement of consecutive cable ports. There is no longer any requirement for clearance room to accommodate a hand wrench 17, since the outermost walls of the cable sealing devices 22 are not engaged by the hand wrench 17.

Figure 6:
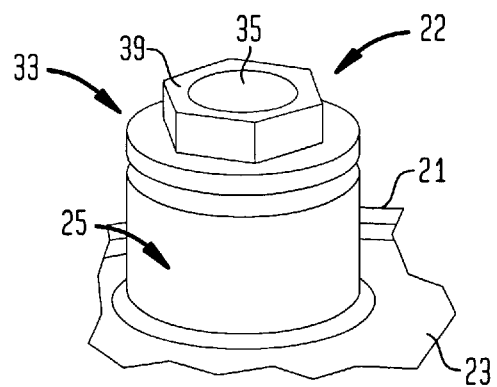
FIG. 6 is a perspective view of one of the cable sealing devices of FIG. 5.
Figure 7:
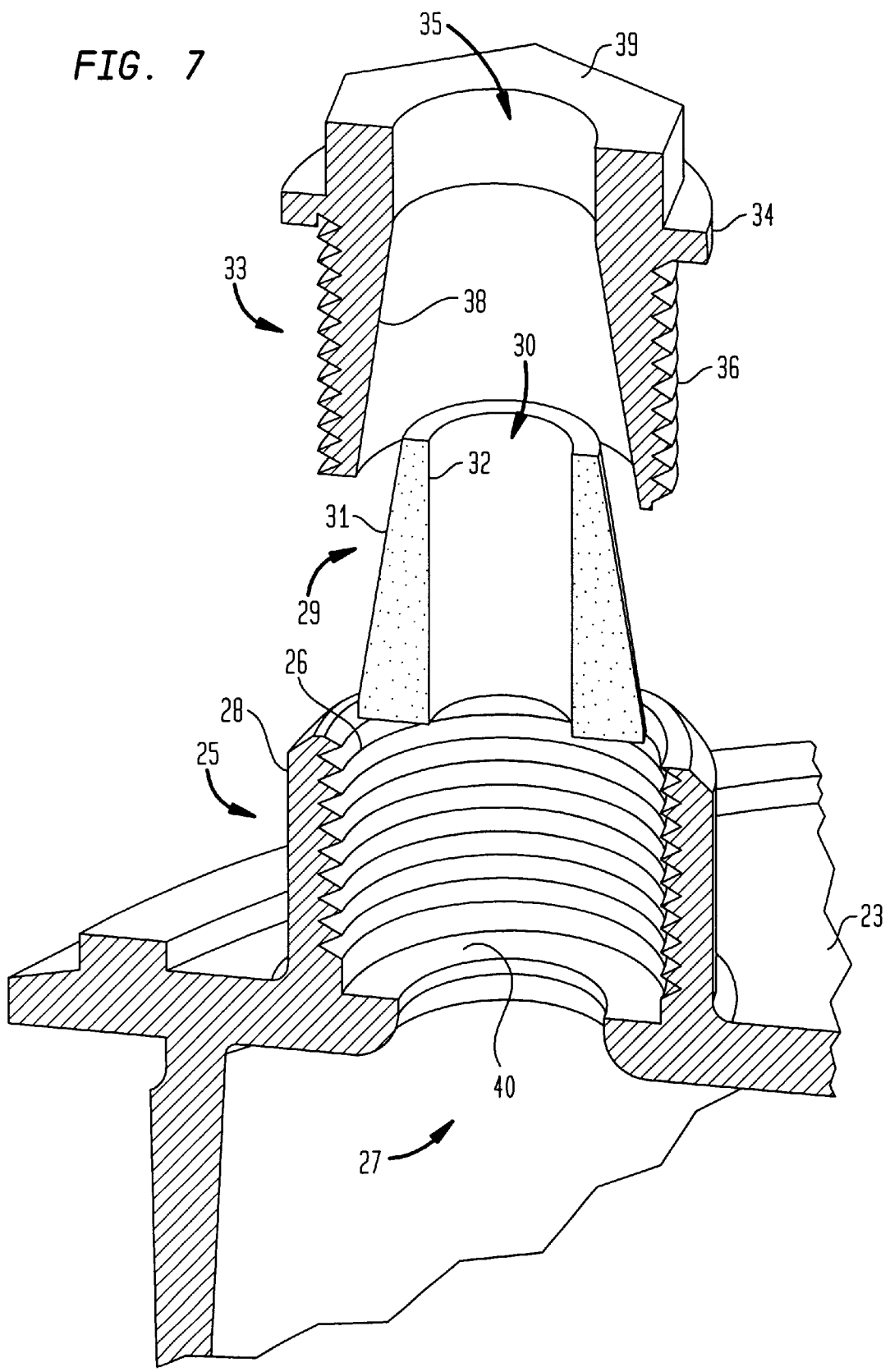
FIG. 7 is a perspective view, in cross section, of a disassembled cable sealing device, in accordance with the present invention.
Figure 8:
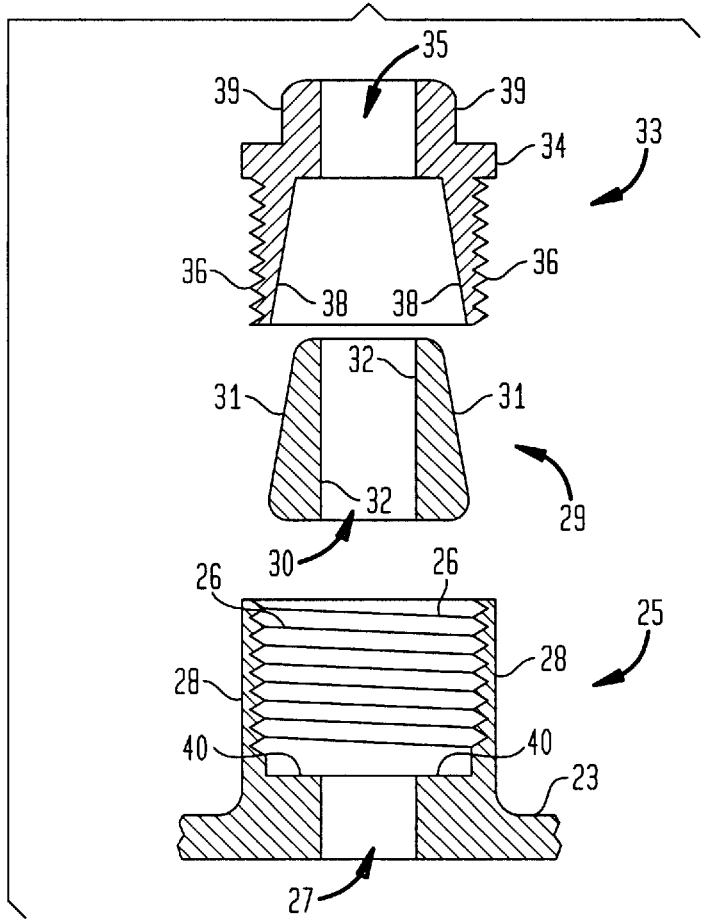
FIG. 8 is a front view, in cross section, of the cable sealing device of FIG. 7.
Figure 10:
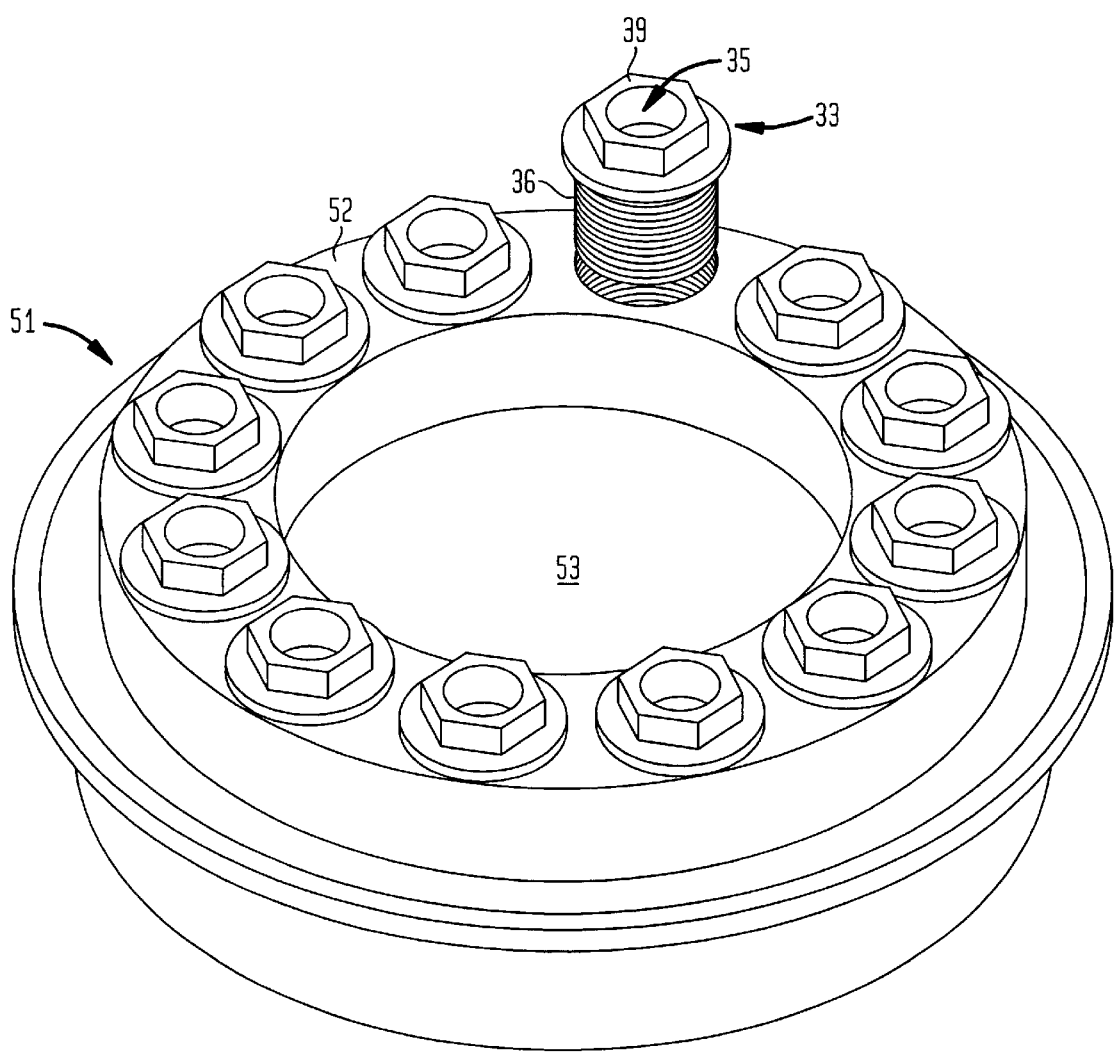
FIG. 10 is a perspective view of a modified enclosure having a plurality of cable sealing devices, in accordance with the present invention.

FIGS. 5 and 6 illustrate a plurality of bases 25, with each base 25 being an upstanding member extending away from the outer surface 23 of the enclosure 21. FIG. 10 illustrates a modification of the enclosure 21 and plurality of bases 25. In FIG. 10, a modified enclosure 51 includes a collar 52 upstanding from an outer surface 53 of the enclosure 51. The collar 52 integrally interconnects each of the plurality of bases 25, so that each base has its second open end being formed in a first surface of the collar 52. The arrangement of FIG. 10 provides increased stability and reduces the manufacturing complexity by reducing the overall surface areas formed on the enclosure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A sealing device comprising:
   a base including a first end, a second open end, and a cylindrical inner wall formed inside said base and communicating said first end to said second open end;
   first threads formed on said cylindrical inner wall;
   a first through hole formed in said first end;
   a cap including a top, an open bottom, and a cylindrical outer wall;
   second threads formed on said cylindrical outer wall for mating engagement with said first threads;
   a second through hole formed in said top;
   a tapering inner wall formed inside said cap and communicating said second through hole to said open bottom;
   a gasket residing adjacent said first end of said base and within said tapering inner, wall of said cap; and
   a third through hole formed in said gasket, wherein said first, second, and third through holes are at least partially aligned.

2. The sealing device according to claim 1, wherein said tapering inner wall of said cap opens toward said base, when said second threads are engaged to said first threads.

3. The sealing device according to claim 2, wherein said gasket includes a tapering outer wall.

4. The sealing device according to claim 3, wherein said tapering outer wall opens toward said base when said gasket resides adjacent said first end of said base and within said tapering inner wall of said cap.

5. The sealing device according to claim 1, wherein said top of said cap includes a tool engaging surface.

6. The sealing device according to claim 5, wherein said tool engaging surface has a hexagonal outer profile.

7. The sealing device according to claim 6, wherein said hexagonal outer profile is located inside an outermost perimeter of said top.

8. The sealing device according to claim 7, wherein said hexagonal outer profile is centered about said second through hole.

9. The sealing device according to claim 1, wherein said gasket is formed of a resilient flexible material.

10. The sealing device according to claim 9, wherein said material is rubber.

11. The sealing device according to claim 1, wherein said first through hole is concentric with said second through hole and said third through hole.

12. An apparatus comprising:
    an enclosure; and
    a first sealing device including:
        a base including a first end attached to said enclosure, a second open end, and a cylindrical inner wall formed inside said base and communicating said first end to said second open end;
        first threads formed on said cylindrical inner wall;
        a first through hole formed in said first end;
        a cap including a top, an open bottom, and a cylindrical outer wall;
        second threads formed on said cylindrical outer wall for mating engagement with said first threads;
        a second through hole formed in said top;
        a tapering inner wall formed inside said cap and communicating said second through hole to said open bottom;
        a gasket residing adjacent said first end of said base and within said tapering inner wall of said cap; and
        a third through hole formed in said gasket, wherein said first, second, and third through holes are at least partially aligned.

13. The apparatus according to claim 12, further comprising:
    a first cable entering said enclosure via said first, second, and third through holes.

14. The apparatus according to claim 13, further comprising:
    a second sealing device located adjacent to said first sealing device.

15. The apparatus according to claim 14, wherein said first sealing device includes a first cylindrical outer wall formed around an outside of said first sealing device's base, which first cylindrical outer wall extends away from an outer surface of said enclosure, and wherein said second sealing device includes a second cylindrical outer wall formed around an outside of a base of said second sealing device, which second cylindrical outer wall extends away from said outer surface of said enclosure and is located adjacent to said first cylindrical outer wall.

16. The apparatus according to claim 14, wherein said enclosure includes a collar having a first surface, and wherein said second open end of said base of said first sealing device is formed in said first surface of said collar.

17. The apparatus according to claim 16, wherein a second open end of a base of said second sealing device is formed in said first surface of said collar, adjacent to said second open end of said base of said first sealing device.

* * * * *